UNITED STATES PATENT OFFICE.

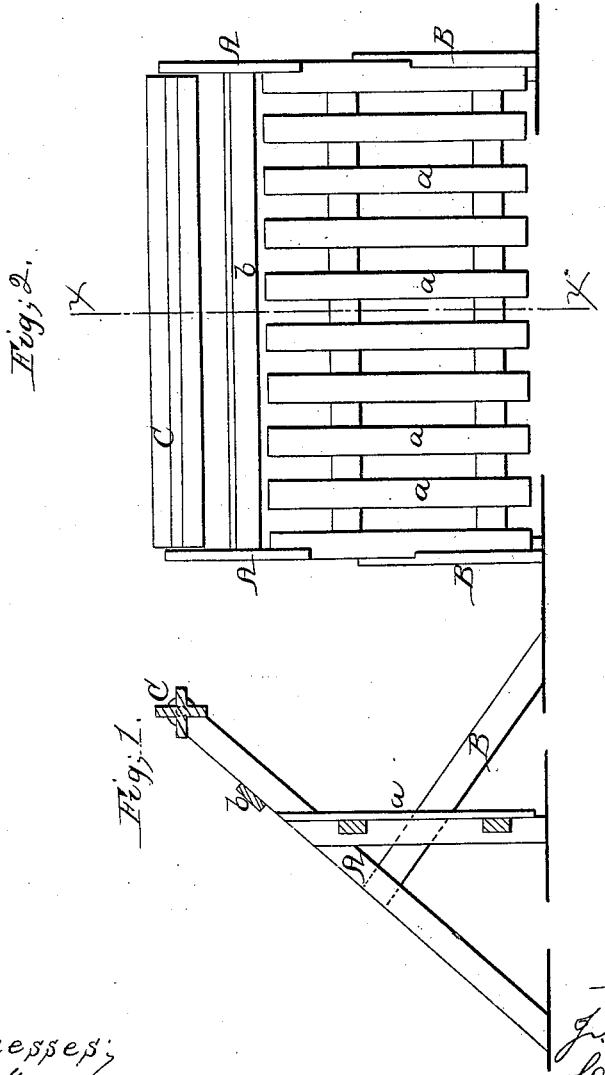

J. K. CLARK AND C. B. CLARK, OF MOUNT PLEASANT, IOWA.

IMPROVED FENCE.

Specification forming part of Letters Patent No. 46,881, dated March 21, 1865.

*To all whom it may concern:*

Be it known that we, J. K. CLARK and C. B. CLARK, of Mount Pleasant, in the county of Henry and State of Iowa, have invented a new and Improved Fence; and we do hereby declare that the following is a full, clear, and exact description thereof, which will enable others skilled in the art to make and use the same, reference being had to the accompanying drawings, forming part of this specification, in which—

Figure 1 is a transverse vertical section of our invention, taken in the line $x\ x$, Fig. 2; Fig. 2, a face or front view of a portion of the same.

Similar letters of reference indicate like parts.

This invention relates to a new and improved fence, designed to protect sheep and other domestic animals from dogs, wolves, &c.

The invention consists in providing the upper part of the fence with a roller or a series of rollers arranged in line with each other so as to be continuous all around the fence or the whole length of the same, and prevent a depredating animal from obtaining a foothold at the top of the fence in attempting to jump the latter.

The fence may be constructed in sections, each section having an inclined bar, A, at each end, secured by a brace, B. The upper parts of the bars A extend or project beyond the outer side of the pickets $a$, and between the upper ends of the bars A there is hung a roller, C, which is allowed to turn freely. This roller C may be square, fluted, or of cylindrical form, and between said roller and the tops of the pickets one or more slats, $b$, are secured to the bars A to prevent the passage of an animal underneath the roller.

By this arrangement it will be seen that the roller is some distance in front of and above the fence, and an animal in attempting to jump the latter will strike the roller, which in consequence of turning freely prevents the animal from obtaining any foothold, and consequently from clearing the fence.

The rollers of the several sections are designed to be all in line with each other.

The fence may be constructed in any of the well-known forms, and the invention readily applied to it, as the bars A may be secured to any fence without any trouble whatever, and to a fence already put up, if required.

We claim as new and desire to secure by Letters Patent—

A roller or series of rollers applied to a fence, substantially as and for the purpose herein set forth.

J. K. CLARK.
C. B. CLARK.

Witnesses for J. K. Clark:
  J. G. VANCISE,
  E. G. BAKER.
Witnesses for C. B. Clark:
  J. H. ATWATER,
  JOHN MASON.